United States Patent [19]
McCann

[11] Patent Number: 5,818,010
[45] Date of Patent: Oct. 6, 1998

[54] DISPLAY ASSEMBLIES

[75] Inventor: Michael Owen McCann, Wotton-Under-Edge, England

[73] Assignee: Smiths Industries PLC, London, England

[21] Appl. No.: 729,573

[22] Filed: Oct. 11, 1996

[30] Foreign Application Priority Data

Oct. 31, 1995 [GB] United Kingdom ................ 9522249.3

[51] Int. Cl.$^6$ ................ H05B 1/00; H05B 3/02; G02F 1/133
[52] U.S. Cl. ................ 219/210; 219/539; 349/21
[58] Field of Search ................ 219/209, 210, 219/214, 520, 539, 552, 553; 349/21, 64, 72, 161; 338/260, 262, 315, 320

[56] References Cited

U.S. PATENT DOCUMENTS

| | | | |
|---|---|---|---|
| 3,495,259 | 2/1970 | Rocholl et al. | 219/522 |
| 4,119,842 | 10/1978 | Hayden et al. | 250/201.1 |
| 4,122,524 | 10/1978 | McCrory et al. | 349/161 |
| 4,206,501 | 6/1980 | Brooks . | |
| 4,415,196 | 11/1983 | Baum et al. | 219/522 |
| 4,773,735 | 9/1988 | Ukrainsky et al. . | |
| 4,775,221 | 10/1988 | Baumgartner, Jr. | 349/161 |
| 4,908,498 | 3/1990 | Kivela | 219/483 |
| 4,952,783 | 8/1990 | Aufderheide et al. . | |
| 4,987,289 | 1/1991 | Bishop et al. . | |
| 5,120,936 | 6/1992 | Shyu et al. | 219/483 |
| 5,694,191 | 12/1997 | Strathman et al. | 349/161 |

FOREIGN PATENT DOCUMENTS

| | | |
|---|---|---|
| 0 317 261 | 5/1989 | European Pat. Off. . |
| 0 435 343 | 2/1991 | European Pat. Off. . |
| 0 438 093 | 7/1991 | European Pat. Off. . |
| 57041617 | 3/1982 | Japan . |
| 57192927 | 11/1982 | Japan . |
| 5019256 | 1/1993 | Japan . |
| 5173153 | 7/1993 | Japan . |

*Primary Examiner*—Teresa J. Walberg
*Assistant Examiner*—Sam Paik
*Attorney, Agent, or Firm*—Pollock, Vande Sande & Priddy

[57] ABSTRACT

A transparent LCD back-lit display has a transparent indium-tin oxide heater layer extending across the display and a resistive metal strip heater, supported in a frame of low thermal conductivity, extending around its edge. One temperature sensor is mounted at the center of the display and another is mounted at the edge. The sensors are connected to a heater control unit, which controls power supplied to the heater layer and the edge strip heater to maintain the temperatures at the center and edge of the display equal.

11 Claims, 2 Drawing Sheets

DISPLAY ASSEMBLIES

BACKGROUND OF THE INVENTION

This invention relates to display assemblies.

The invention is more particularly concerned with display assemblies including a flat panel display and a display heater.

Some forms of display, such as liquid crystal displays (LCDs), only operate correctly at temperatures above normal ambient temperature. This is a particular problem with more complex, high performance LCDs having a large number of grey scales. Typically, a sixty-four grey scale LCD should be at a temperature between 40° C. and 75° C. to operate correctly. Currently, high performance LCDs usually incorporate a film of indium tin oxide, to provide heating, especially during start-up when heat from the display backlight will not have built up sufficiently.

The problem with these thin-film heating elements is that the heating effect at the center of the display is greater than towards the edges. This problem is aggravated by the fact that the display is retained by a support around the edges, which acts as a heat sink for the thermal energy produced by the heater. The difference in temperature between the center of the display and the edge during start-up conditions can be as much as 40° C. or 70° C. when starting from very low temperatures. Where the display is used in a critical application, such as in an aircraft, it can be important to raise its temperature to the correct operating value within a very short period; this can be as little as 30 seconds or less. Although it may be possible to achieve sufficient warming in the center of the display within the desired time, the edge of the display may remain below the correct temperature for longer than desired. Furthermore, because the edge needs to be raised to the correct operating temperature, this means that the center of the display is often heated to a greater temperature than is necessary. This can lead to delamination of the display over a prolonged period.

BRIEF SUMMARY OF THE INVENTION

It is an object of the present invention to provide a display assembly that can be used to overcome the above-mentioned problems.

According to the present invention there is provided a display assembly comprising a flat panel display and a heater, the heater comprising a planar heating element extending across the display and an edge heater extending around the edge of the display.

In this way, it is possible to achieve a more even heating across the display.

The planar heating element is preferably of a transparent resistive material, such as indium-tin oxide. The edge heater may include a resistive metal strip electrically insulated from the planar heating element. The edge heater is preferably mounted in a frame of a material having a low thermal conductivity. The flat panel display may be an LCD display and is preferably transparent, the assembly including a backlight. The assembly may include a first temperature sensor mounted to monitor the temperature towards the center of the display and a second temperature sensor mounted to monitor the temperature towards the edge of the display. The outputs of the first and second sensors are preferably connected to a heater control unit, the heater control unit controlling the power supplied to the planar heating element and the edge heater such as to maintain the temperature of the center and edge of the display substantially equal. The outputs of the first and second temperature sensors may be connected to a display driver unit, the display driver unit controlling the power supplied to the display according to display temperature. The assembly may be arranged to supply power to the heater when the assembly is first switched on and to supply power sufficient to cause heating only while the flat panel display is below its operating temperature.

A display assembly according to the present invention will now be described, by way of example, with reference to the accompanying drawings.

DETAILED DESCRIPTION OF THE PREFERRED EMBODIMENT

Figure 1:
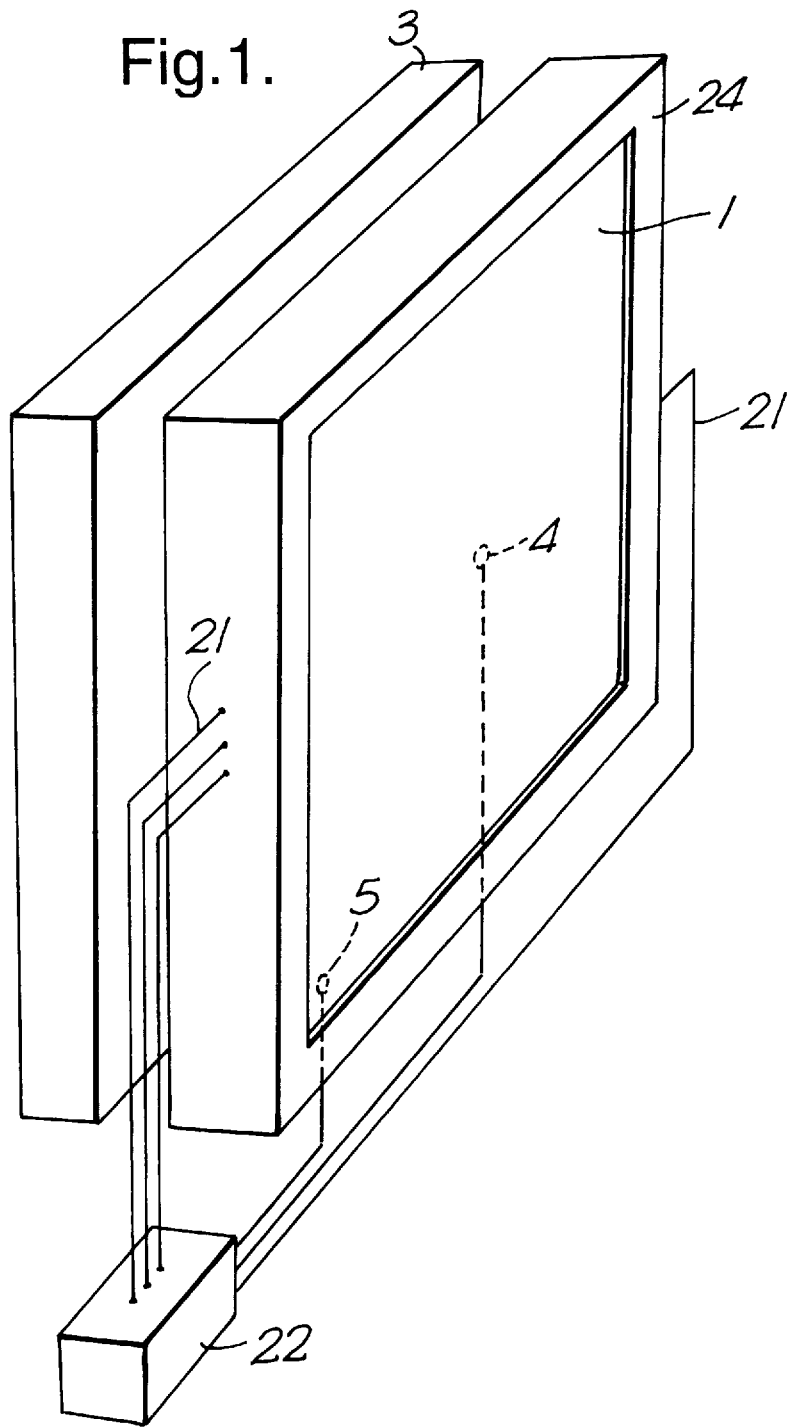
FIG. 1 is a perspective view of the assembly.
Figure 2:
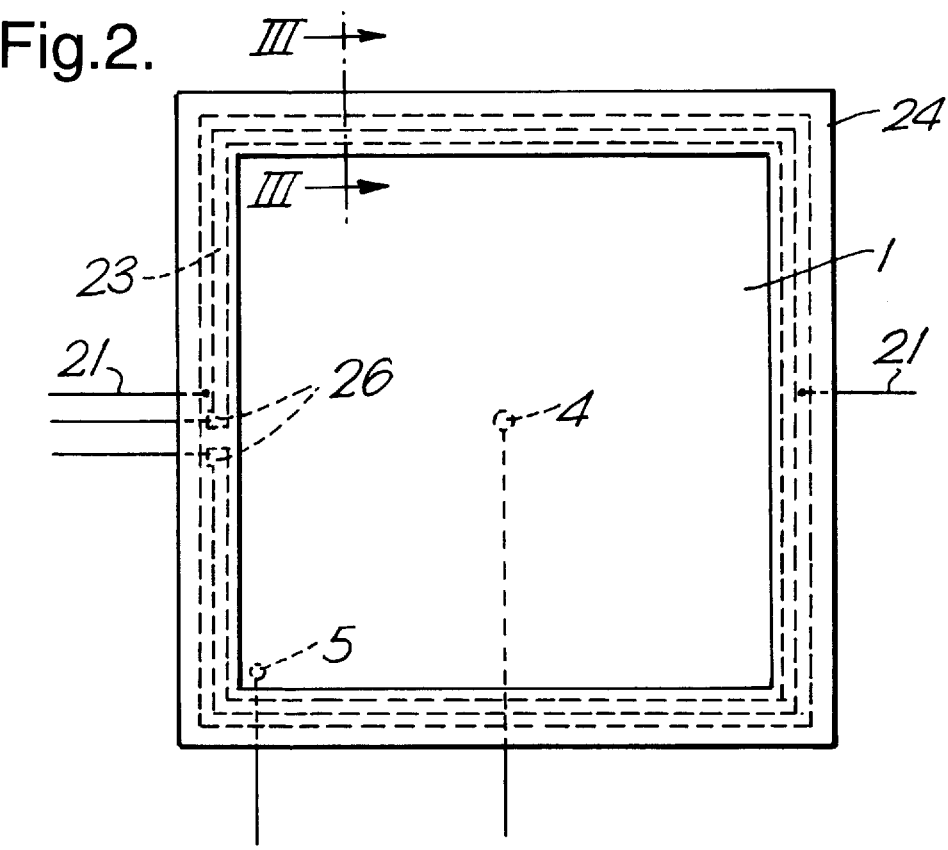
FIG. 2 is an elevation view of the front of the assembly.
Figure 3:
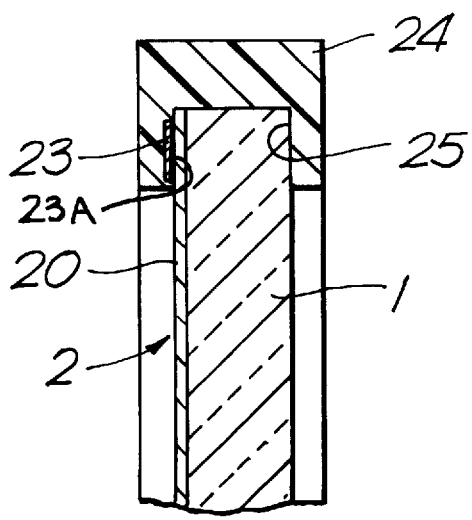
FIG. 3 is a sectional side elevation of a part of the assembly along the line III—III of FIG. 2.

The display assembly comprises an LCD display 1, a display heater indicated generally by the numeral 2 and a backlight 3 for illuminating the display from the rear.

The display 1 is a conventional matrix array LCD panel, typically of square shape with sides about 10 cm long, and having a high performance with a sixty-four grey scale. The display 1 is driven by conventional graphics and address/multiplexing electronics, not shown.

The heater 2 comprises two elements. One element is a transparent layer 20 of an electrically-resistive material, such as indium-tin oxide, coated on the rear surface of the display panel 1. The transparent layer 20 is contacted at opposite edges by wires 21 by which current is supplied to the layer from a heater driver unit 22. The other element of the heater 2 is an edge heater 23 incorporated into a mounting frame 24 for the display. The frame 24 has a rebate 25 into which the edge of the display 1 is received and is preferably of a material with a low thermal conductivity such as glass-reinforced plastics. The edge heater 23 takes the form of a resistive metal strip extending as a track along the four sides of the frame and having electrical terminals 26 at each end by which the heater is connected to the driver unit 22. The edge heater 23 has an electrically-insulative coating (23A) and bears against the rear side of the display panel 1.

Two small temperature sensors 4 and 5 are attached to the rear surface of the display 1 to monitor the temperature of the display at its center and close to its edge respectively.

The outputs from the sensors 4 and 5 are connected to the heater driver 22, to control heating of the display, and to the display electronics (not shown).

When the display is started from cold, the heater driver 22 supplies power for both the thin-film layer 20 and the edge heater 23. Typically, about one quarter of the total heating load is supplied to the edge heater 23. In this way, the edge heater 23 increases the heating effect towards the edge of the display to compensate for the reduction in heating that would be produced away from the center by the layer 20 alone. This produces substantially even heating across the entire viewing area.

The outputs from the temperature sensors 4 and 5 enable the heater driver 22 to vary the proportion of power supplied to the layer 20 and to the edge heater 23 if the relative temperatures of the center and edges should vary. The outputs of the temperature sensors 4 and 5 are also used by the display driver to vary the power supplied to the display according to display temperature.

After prolonged use, the heating effect produced by the backlight 3 may be sufficient to maintain the display 1 at its operating temperature so that it is no longer necessary to supply power sufficient to cause heating to one or both heater elements 20 or 23.

Because the mechanical support for the edge of the display is provided by a thermally insulative member 24, the differential heating across the surface of the display 1 is reduced, even without the effect of the edge heater 23.

The present invention enables a greater proportion of the display area to achieve its optimum operating temperature more rapidly than has previously been possible, so that the quality of the display image is not degraded towards the edges. This is important in critical applications, such as in aircraft displays. The invention also avoids the need to apply excessive heating to the center of the display in order to achieve correct temperature at the edges, thereby reducing the risk of damage to the display.

It will be appreciated that the edge heater could be of various different kinds and need not be a metal strip, as described.

What I claim is:

1. A display assembly comprising a flat panel display and a heater, wherein said heater comprises the combination of both a planar heating element extending across said display and an edge heater extending around an edge of said display.

2. A display assembly according to claim 1, wherein said planar heating element is of a transparent resistive material.

3. A display assembly according to claim 2, wherein said planar heating element is of indium-tin oxide.

4. A display assembly according to claim 1, wherein said edge heater includes a resistive metal strip.

5. A display assembly according to claim 1, wherein said edge heater is mounted in a frame of a material having a low thermal conductivity.

6. A display assembly according to claim 1, wherein said flat panel display is an LCD display.

7. A display assembly according to claim 1, wherein said assembly includes a first temperature sensor mounted to monitor the temperature towards the center of said display and a second temperature sensor mounted to monitor the temperature towards an edge of said display.

8. A display assembly according to claim 7, including a heater control unit and a connection between said first and second temperature sensors and said heater control unit, and wherein the heater control unit is arranged to supply power to both said planar heating element and to said edge heater such as to maintain the temperature of the center and edge of the display substantially equal.

9. A display assembly according to claim 1, wherein the assembly is operable to supply power to said heater when the assembly is first switched on and to supply power sufficient to cause heating only while said flat panel display is below its operating temperature.

10. A display assembly comprising: a transparent flat panel display; a backlight located behind said display; and a heater located between said display and said backlight, said heater comprising the combination of both a transparent resistive planar heating element extending across said display and an edge heater extending around an edge of said display.

11. A display assembly comprising: a flat panel display; a heater, said heater comprising the combination of both a planar heating element extending across said display and an edge heater extending around an edge of said display; a heater control unit; a first temperature sensor mounted adjacent a center of said display; a second temperature sensor mounted adjacent an edge of said display; and means connecting said first and second temperature sensors to said heater control unit to control operation of said heater control unit, said heater control unit being operable to supply power to cause heating of said planar heating element and said edge heater so as to maintain the temperatures at the center and edge of the display substantially equal to one another when the ambient temperature of said display is below a predetermined display operating temperature.

* * * * *